(12) United States Patent
Howson

(10) Patent No.: US 8,446,409 B2
(45) Date of Patent: May 21, 2013

(54) METHOD AND APPARATUS FOR RENDERING COMPUTER GRAPHIC IMAGES OF TRANSLUCENT AND OPAQUE OBJECTS

(75) Inventor: John William Howson, St. Albans (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 1120 days.

(21) Appl. No.: 11/787,893

(22) Filed: Apr. 18, 2007

(65) Prior Publication Data

US 2007/0211048 A1    Sep. 13, 2007

Related U.S. Application Data

(63) Continuation of application No. 10/795,561, filed on Mar. 5, 2004, now abandoned.

(30) Foreign Application Priority Data

Jul. 25, 2003    (GB) .................................. 0317479.4

(51) Int. Cl.
| | |
|---|---|
| G06T 15/40 | (2011.01) |
| G06T 15/00 | (2011.01) |
| G06T 15/50 | (2011.01) |
| G09G 5/00 | (2006.01) |

(52) U.S. Cl.
USPC ............ 345/421; 345/419; 345/426; 345/582

(58) Field of Classification Search
None
See application file for complete search history.

(56) References Cited

U.S. PATENT DOCUMENTS

| | | | | |
|---|---|---|---|---|
| 5,923,333 | A | * | 7/1999 | Stroyan .......................... 345/422 |
| 5,943,060 | A | * | 8/1999 | Cosman et al. ................ 345/613 |
| 6,271,848 | B1 | | 8/2001 | Yasui et al. |
| 6,457,034 | B1 | | 9/2002 | Morein |
| 6,476,807 | B1 | * | 11/2002 | Duluk et al. ................... 345/421 |
| 6,906,715 | B1 | * | 6/2005 | Dunn ............................. 345/421 |

FOREIGN PATENT DOCUMENTS

| | | | |
|---|---|---|---|
| GB | 2352381 A | * | 1/2001 |
| WO | WO 00/28482 | | 5/2000 |
| WO | WO 01/01352 A1 | | 1/2001 |

OTHER PUBLICATIONS

International Search Report dated Feb. 7, 2005, in Application No. PCT/GB2004/002717 (4 pages).

* cited by examiner

Primary Examiner — Tize Ma
(74) Attorney, Agent, or Firm — Flynn, Thiel, Boutell & Tanis, P.C.

(57) ABSTRACT

A method and an apparatus provided for rendering three-dimensional computer graphic images which include both translucent and opaque objects. A list of objects which may be visible in the images is determined and for each pixel in the list a determination is made as to whether or not the object in the list may be visible at that pixel. A data tag is stored for a transparent object determined to be visible at the pixel, and the data tag and object data are passed to a texturing and shading unit when the translucent object is determined to be overwriting the location in a tag buffer already occupied by another data tag.

12 Claims, 4 Drawing Sheets

METHOD AND APPARATUS FOR RENDERING COMPUTER GRAPHIC IMAGES OF TRANSLUCENT AND OPAQUE OBJECTS

CROSS-REFERENCE TO RELATED APPLICATION

This application is a continuation of U.S. Ser. No. 10/795,561, now abandoned, which corresponds to U.K. Application No. 0317479.4, filed Jul. 25, 2003.

BACKGROUND OF THE INVENTION

This invention relates to a 3-dimensional computer graphics system and in particular to methods and apparatus which reduce the number of times of modifying the data assigned to each pixel when rendering an image in such a system.

Tile based rendering systems are known. These break down an image to be rendered into a plurality of rectangular blocks or tiles. The way in which this is done and the subsequent texturing and shading performed is shown schematically in FIG. 1. This shows a geometry processing unit 2 which receives the image data from an application and transforms the data into screen space using a well-known method. The data is then supplied to a tiling unit 4, which inserts the screen space geometry into object lists for a set of defined rectangular regions, or tiles, 6. Each list contains primitives (surfaces) that exist wholly or partially in a sub-region of a screen (i.e. a tile). A list exists for every tile on the screen, although it should be borne in mind that some lists may have no data in them.

Data then passes tile by tile to a hidden surface removal unit 8 (HSR) and from there to a texturing and shading unit 10 (TSU). The HSR unit processes each primitive in the tile and passes to the TSU only data about visible pixels.

Many images comprise both opaque and translucent objects. In order to correctly render such an image, the HSR unit must pass "layers" of pixels which need to be shaded to the TSU. This is because more than one object will contribute to the image data applied to a particular pixel. For example the view from the inside of a building looking through a pane of dirty glass requires both the geometry visible through the glass, and then the pane of glass itself to be passed to the TSU. This process is referred to as "pass spawning".

Typically, a tile based rendering device of the type shown in FIG. 1 will use a buffer to hold a tag for the frontmost object for each pixel in the tile currently being processed. A pass is typically spawned whenever the HSR unit 8 processes a translucent object, before the visibility test is performed. This results in all currently visible tags stored in the buffer followed by the visible pixels of the translucent object being sent to the TSU, i.e. more than one set of pixel data being passed for each pixel.

The flow diagram of FIG. 2 illustrates this approach. In this, a determination is made at step 12 as to whether or not a primitive being processed is opaque. If it is not, then the buffer of tags is sent to the TSU 10 at step 14. All visible tags for the non-opaque primitives are then also passed to the TSU at step 15. The HSR unit 8 will then move onto the next primitive at step 18. If the primitive is determined to be opaque at step 12, then its tags are written into the buffer at step 16 before moving onto the next primitive at step 18. The tag is a piece of data indicating which object is visible at a pixel. More than one tag per pixel is required when translucent objects cover opaque objects.

Use of the approach above means that opaque pixels that are not covered by translucent pixels, and are potentially obscured by further opaque objects may be passed to the TSU unnecessarily. In addition to this, a translucent object is passed to the TSU even if an opaque object subsequently obscures it.

SUMMARY OF THE INVENTION

The presence of the tag buffer in the above description enables modifications to be made to the pass spawning rules (also described above) that allow the removal, of some unnecessary passes.

In an embodiment of the present invention, rather than spawning a pass at the point a translucent object is seen, the translucent tags are rendered into the tag buffer in the same manner as opaque objects and a pass only spawned at the point a visible translucent pixel is required to be written to a location that is already occupied. Further, as the translucent object tags are now being rendered into the tag buffer, there is no need to pass them immediately to the TSU. Therefore, in the event of them being subsequently obscured they may be discarded.

The invention is defined with more precision in the appended claims to which reference should now be made.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENT

Figure 1:
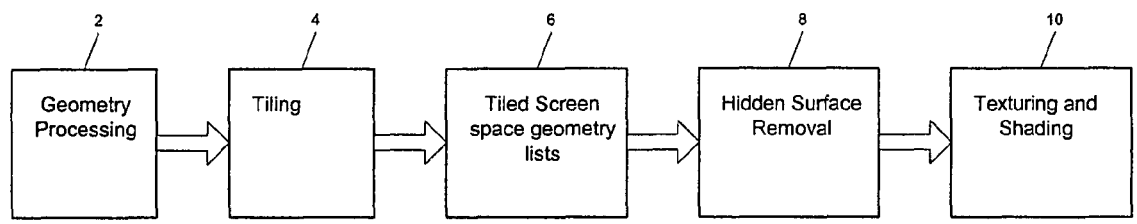
FIG. 1 shows a block diagram of a tile based rendering system discussed above.
Figure 2:
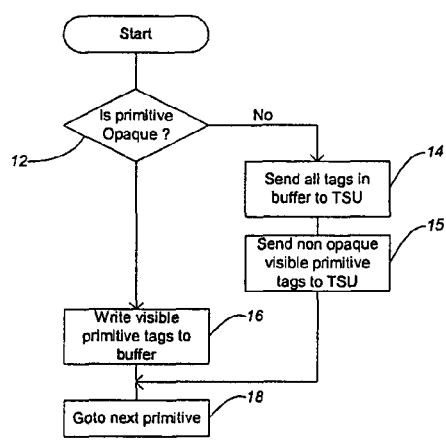
FIG. 2 shows a flow chart of a known pass spawning system.
Figure 3A:
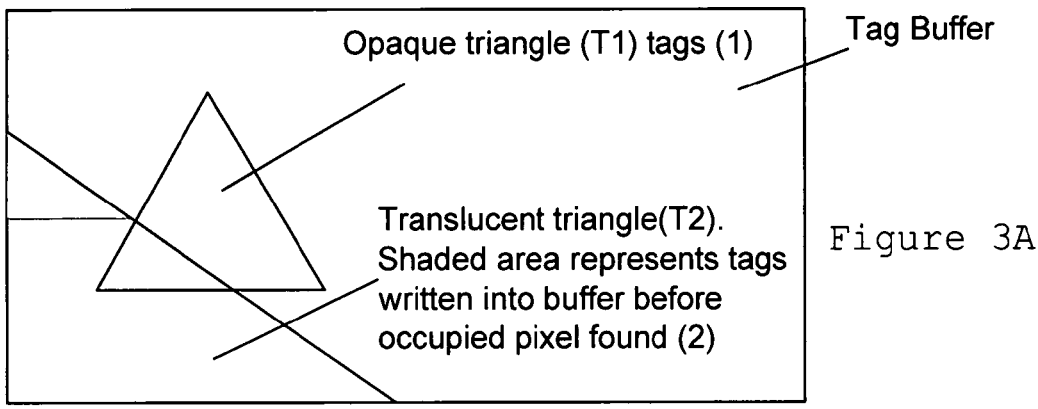
FIGS. 3A to 3C show a sequence of three triangles being rendered using modified pass spawning rules embodying the invention.
Figure 3B:
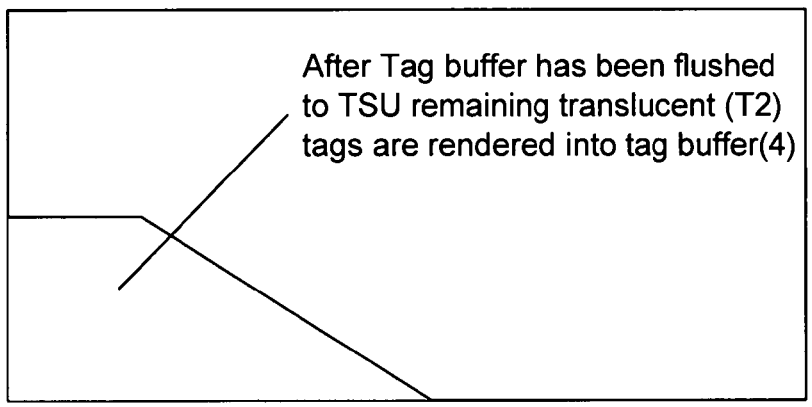
Figure 3C:
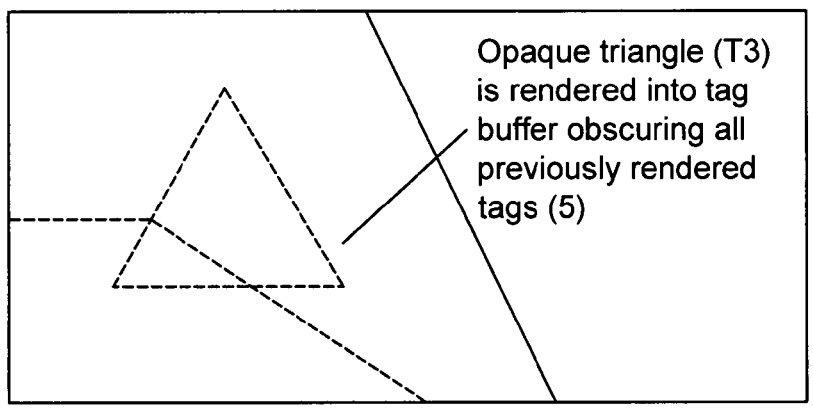

In FIGS. 3A to 3C a sequence of three triangles is shown to be rendered using a set of modified pass spawning rules. In FIG. 3A, an opaque triangle T1 is rendered into a tag buffer. If a translucent triangle T2 is rendered on top of the visible opaque pixels, then the HSR unit must pass those pixels to the TSU before it can continue to rasterize the translucent tags. The opaque triangle is encountered in scan line order as T2 is rasterized. Thus, all the previously rasterized pixels of T1 and the pixels of T2 are passed to the TSU. This leaves the remainder of the translucent object as shown in FIG. 3B. An opaque triangle T3 is then rendered into the tag buffer as shown in FIG. 3C. This triangle T3 obscures all of T1 and T2.

It will be seen that tags from T1 and T2 have been passed unnecessarily to the TSU in spite of the improved rules. The triangles passed unnecessarily are shown by dotted lines in FIG. 3C. In addition to this, if T3 had been translucent and was subsequently obscured by another object, all tags from T2 would be passed to the TSU.

If more than one tag buffer is provided, then this can further reduce the number of unnecessary passes. In a system with N tag buffers a minimum of N obscured passes can be removed. This is achieved by switching to a new tag buffer each time an attempt is made to write a translucent pixel to an occupied location, until all tag buffers have been written to. At this point, the first tag buffer is passed to the TSU.

If an opaque pixel is written to the current tag buffer, this will result in the same pixel being invalidated in all other buffers, thus removing any obscured pixels. This can be done as any pixel that is written to by an opaque primitive will only be composed of the data generated by that primitive.

Figure 4:
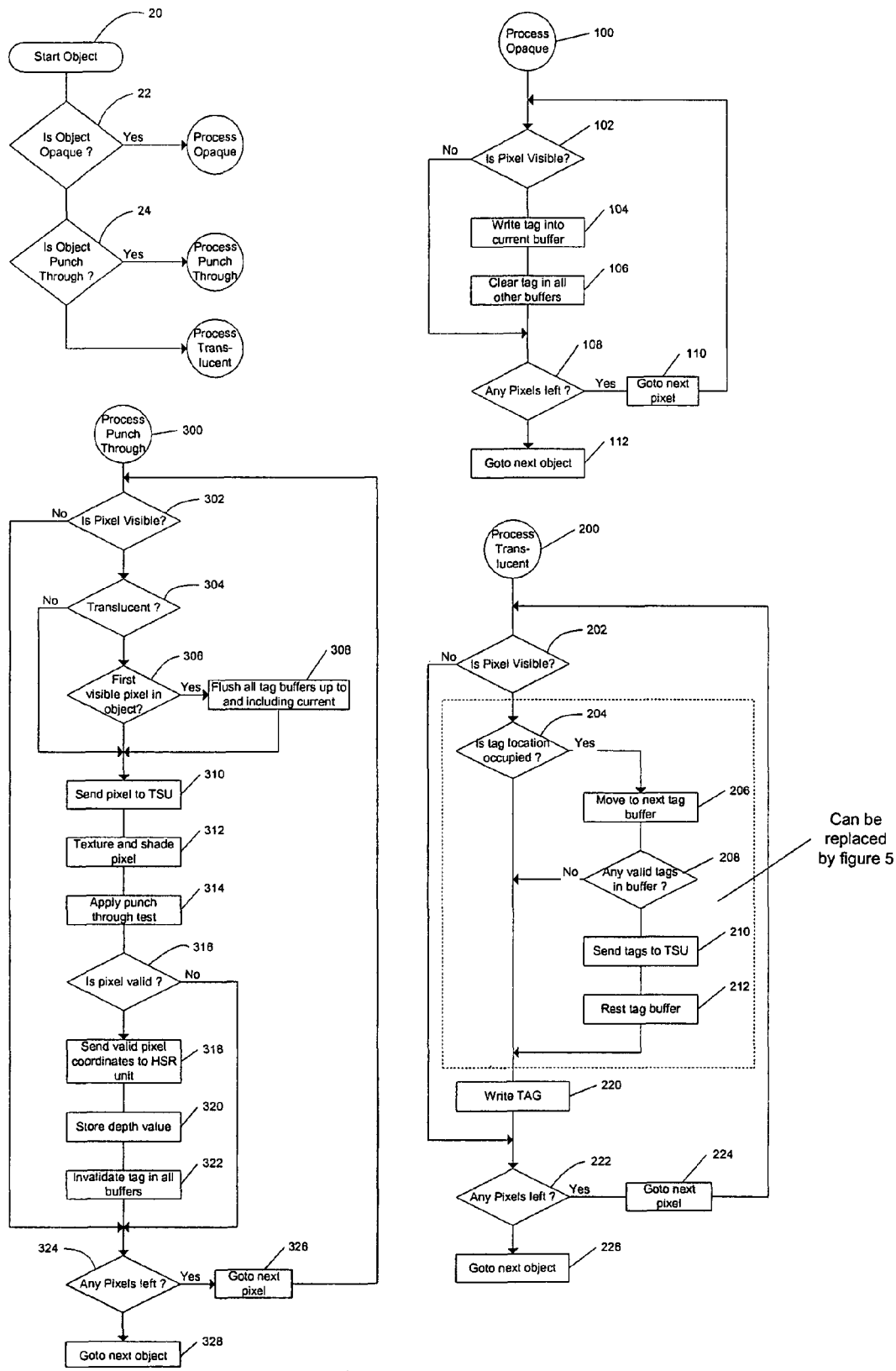
FIG. 4 is a flow diagram of the embodiment of the invention.

The flow chart of FIG. 4 illustrates how the pass spawning rules behave in this case.

After the start at step 20 of processing an object, as in FIG. 4, a determination is made as to the type of the object at steps 22 and 24. If an object is determined to be opaque at step 22, then the system executes the opaque processing path at step 100. If the object is not opaque and is determined to be punch through at step 24, then punch through processing path is executed at step 300 otherwise translucent processing is executed at step 200.

If the object is opaque, it is processed from step 100 on a pixel by pixel basis. For each pixel within the object the system first determines its visibility at step 102. If a pixel is not visible, then the system skips to step 108 to determine whether there are any more pixels left in the object. If a pixel is visible, then its tag is written into the current tag buffer at step 104, and the tags in all other buffers are cleared at step 106. The system then determines at step 108 whether any more pixels are left to process from the current object. If there are any pixels left, it moves to the next pixel at step 110 and continues processing from step 102. If there are no more pixels to process in the object, then the system moves to the next object at step 112 and returns to step 20.

3D computer graphics often use what is termed as "punch through" objects. These objects use a back end test to determine whether a pixel should be drawn. For example, before a pixel is written to the frame buffer, its alpha value can be compared against a reference using one of several compare modes. If the result of this comparison is true, then the pixel is determined to be visible. If false, then it is not visible. Pixels that are determined not to be visible do not update the depth buffer. It should be noted that this test can be applied to both opaque and partially translucent objects. This technique is common in 3D game applications because it allows complex scenes such as forests to be modelled using relatively few polygons and because a traditional Z buffer can correctly render punch through translucency irrespective of the order in which polygons are presented to the system.

As the update of the depth buffer is dependant on the results of the back end test tile based rendering (TBR), systems must handle these objects in a special manner. Existing TBR systems will first spawn a pass as if the punch through objects were transparent. The punch through object is then passed to the TSU which then feeds back visibility information to the HSR unit which updates the depth buffer as necessary.

The handling of punch through objects can be optimized. If punch through is applied to an opaque object, it will either be fully visible or not visible at all, and this allows the object to be treated as opaque with respect to the flushing of the tag buffers. Specifically, at the point an opaque punch through object is received any pixels that are determined to be visible by the hidden surface removal (HSR) unit are passed directly to the TSU. The TSU then feeds back pixels that are valid to the HSR unit which will, for the fed back pixels, update the depth buffer as appropriate and invalidate the same pixels in the tag buffer. This is possible as the act of passing the punch through pixels to the TSU means because they have already been drawn, and so any valid tags at the same locations in the tag buffer are no longer needed. If multiple tag buffers are present, then the tags are invalidated across all buffers.

Partially transparent punch through data requires all the used tag buffers including the current tag buffer to be flushed to the TSU. This is because the transparency may need to be blended with any overlapped tags currently contained in the tag buffer. Alternatively, the punch through tags may be passed to the TSU with their states modified such that they will not update the frame buffer image and their tags are written to the next buffer as dictated by the punch through test. This allows objects that lie under the punch through object and are subsequently obscured not to be rendered. However, this is at the cost of potentially rendering the punch through object twice, first to determine pixel visibility and second to render the final image whether it is not obscured. The impact of rendering the punch through object twice could be reduced by splitting the shading state of the TSU pixel into one required to determine punch through state and the other required to render the final image.

As far as the flow diagram of FIG. 4 is concerned, where the object is determined to be a punch through at step 24, the system jumps to Process Punch Through 300. The object is then processed pixel by pixel, first determining visibility at step 302. If a pixel is not visible, the system skips to step 324. If a pixel is visible, a further test is made at step 304 to determine whether the object pixel is also transparent. If this is determined to be the first visible pixel within the object at step 306, then all the used tag buffers including the current buffer are flushed at step 308, i.e. sent to the TSU. The test for translucency is performed per pixel so that the tag buffers do not get flushed in the event that the object is not visible. The pixels for the object itself are then sent to the TSU at step 310 where texturing and shading are applied at step 312 using well-known methods. A punch through test is then applied at step 314 and the validity of the pixel determined at step 316. If the pixel is found to be invalid at step 316, e.g. it fails the alpha test, the system skips to step 324. If the pixel is valid, its coordinates are passed back to the HSR unit at step 318, which will then store the pixels depth value to the depth buffer at step 320 and invalidate the corresponding tag in all tag buffers at step 322. The system then determines whether there are any more pixels to be processed in the object at step 324. If there are any more pixels, it moves to the next pixel at step 326 and jumps back to step 302 to continue processing. If no more pixels are present in the object, the system moves to the next object at step 328 and returns to step 20.

If the punch through determination at step 24 is negative, then the object must be translucent and the system jumps to Process Translucent 200. The object is then processed pixel by pixel, first determining visibility at step 202. If a pixel is not visible, the system skips to step 222. If the pixel is visible, the system determines whether location in the current tag buffer is occupied at step 204. If the current tag buffer location is determined to be occupied, the system will move to the next tag buffer at step 206. A determination is then made as to whether or not there are any valid tags in the buffer at step 208. If there are any valid tags, they are sent to the TSU at step 210 and the tag buffer reset at step 212. If there are no valid tags, then a tag is written at step 220 and the system goes on to the next pixel at step 224 or object at step 226 as described for opaque objects.

Figure 5:
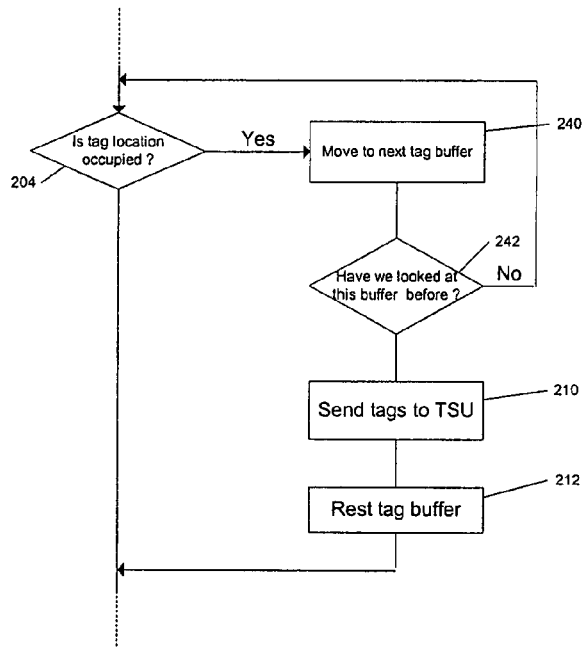
FIG. 5 is an enhancement to FIG. 4.

As opaque objects invalidate tags across all buffers, the pass spawning rules can be further extended such that passes only spawn when no tag buffer can be found into which a translucent pixel can be written. FIG. 5 illustrates these updated rules which can be used to replace the portion of the flow diagram of FIG. 4 surrounded by a dotted line. Instead of the determination at step 208 as to whether there are any valid tags in the buffer, a determination is made as to whether or not this buffer has been looked at before. If it has, then the flow moves onto steps 210 and 212. If it has not, the flow passes back to step 204 where a determination is made as to whether or not the tag location is occupied. If it is occupied, then the diagram moves to the next tag buffer at step 240 to determine again whether or not that buffer has been looked at at step 242.

A further enhancement can be made to single and multiple buffer implementations. Rather than flushing the whole tag buffer at the point that no unoccupied pixel can be found for a translucent object, only those tags that would be overwritten by the translucent pixel are flushed to the TSU. The main disadvantage of this approach is that it can result in the partial submission of an object to a TSU which can cause the object to be submitted many times. This leads to additional state fetch and set up costs in the TSU. This could be alleviated by submitting all pixels with the same tag value to the TSU rather than only those that are overlapped by the translucent object. Alternatively, the tag buffer could be subdivided into square/rectangular sections such that when the above condition occurs, only the section of the tag buffer containing the conflict would be flushed. This approach also potentially results in multiple submissions of tags to the TSU but to a lesser extent.

Figure 6:
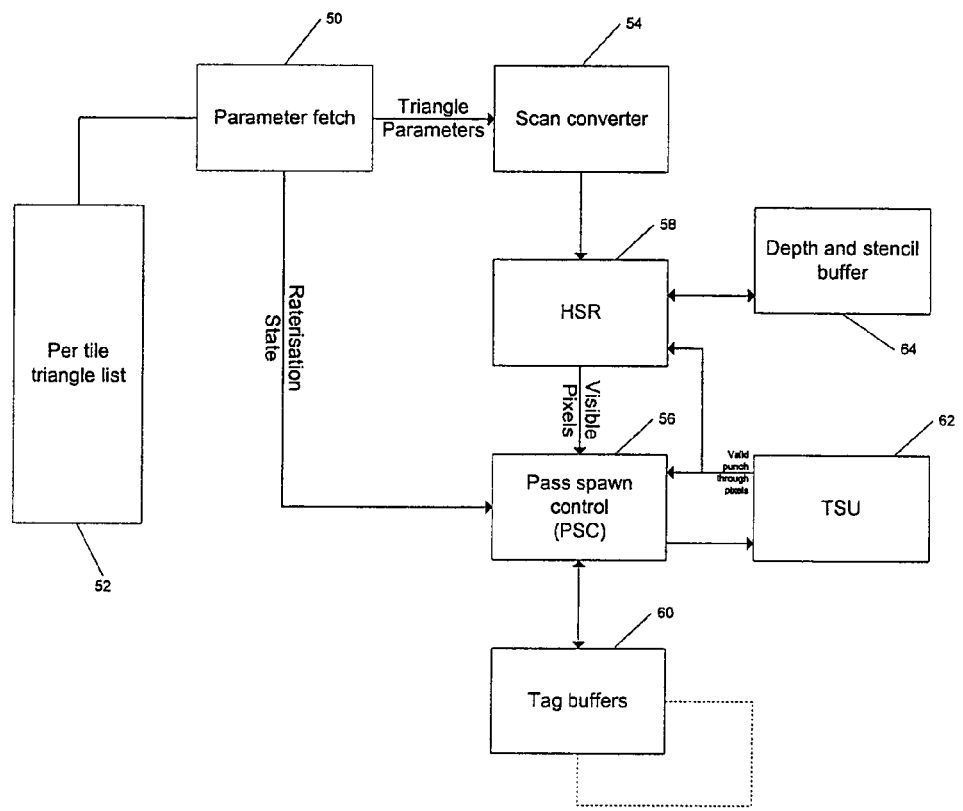
FIG. 6 is a block diagram of an embodiment of the invention.

A block diagram of a preferred embodiment of the invention is shown in FIG. 6. This comprises a parameter fetch unit 50 which reads in per tile lists of triangles and rasterisation state from a per triangle list 52. These are then passed to a scan converter 54 and to a pass spawn control unit 56 respectively. The scan converter 54 generates position, depth and stencil values for each pixel within each triangle and passes them to an HSR unit 58. The HSR unit determines the visibility of each pixel and passes this information onto the pass spawning control unit (PSC) 56. This unit has access to two or more tag buffers 60 which are cycled through in a circular manner. For opaque pixels the PSC unit writes the tag of the triangle to the current tag buffer and invalidates the corresponding location in the other buffer. For a translucent pixel the PSC unit checks to see whether the location in the current tag buffer is valid. If it is valid, then it switches to the other tag buffer. If a tag location is not valid, it writes the translucent tag and moves onto the next pixel. If the tag location is valid, then the tag buffer is flushed to the texturing and shading unit 62. At this point all locations in the tag buffer are marked as invalid and the translucent tag is written to the buffer. For an opaque punch through pixel the PSC passes all visible pixels directly to the TSU 62. The TSU determines pixel validity as appropriate and returns the status of those pixels to the HSR and PSC units 58, 56. The HSR and PSC units then update depth buffer and invalidate locations in tag buffers respectively for valid pixels. Translucent punch through pixels behave the same as opaque punch through except that the PSC unit will flush all currently valid tags in the tag buffers to the TSU before proceeding. This process is repeated for all pixels in all triangles within the tile.

When the parameter fetch unit 50 determines that there are no more triangles in the current tile, it signals to the pass spawning unit 56 to flush any remaining valid tags from the tag buffers to the TSU 62. The parameter fetch unit then proceeds to read the parameter list for the next tile and repeats the process until all tiles that make up the final image have been rendered. It should be noted that all of the units, with the exception of the parameter fetch, can be modified to operate on multiple pixels in parallel, thereby speeding up the process.

The HSR unit 58 has access to a depth and stencil buffer 64 in which the depth and stencil values for each pixel within each triangle are stored.

What is claimed is:

1. A method for rendering 3-dimensional computer graphic images which include translucent and opaque objects, the method comprising the steps of:
    subdividing a scene to be rendered into a plurality of rectangular subregions;
    for each of the sub-regions, determining a list of objects which may be visible in the images;
    for each pixel in each object in the list, determining whether or not the object in the list may be visible at that pixel;
    storing a data tag for the translucent or opaque object determined to be visible at the pixel in a tag buffer; and
    passing the data tag from the tag buffer and object data for the object to a texturing and shading unit in response to a determination that the translucent or opaque object is overwriting a location in the tag buffer already occupied by another data tag.

2. The method according to claim 1 further comprising the steps of:
    clearing the data tags for the pixel from all the tag buffers when an opaque surface is determined to be visible at the pixel; and
    storing a new data tag associated with the opaque surface.

3. The method according to claim 1 further comprising the steps of:
    initially subdividing a scene to be rendered into a plurality of rectangular sub-regions; and
    subsequently performing the method for each of the sub-regions.

4. The method according to claim 1 further comprising the steps of:
    determining whether or not the object is a punch through object; and
    performing a different process when the punch through object is detected.

5. The method according to claim 4 further comprising the steps of:
    determining whether the punch through object is opaque;
    clearing all the data tags from all the tag buffers for the pixels intersected by that object if an opaque object is detected; and
    sending punch through object data to the texture and shading unit.

6. The method according to claim 4 further comprising the steps of:
    determining whether the punch through object is translucent; and
    passing all the data tags and the object data for the pixel to the texture and shading unit, including the object data for the translucent punch through object, if a translucent object is detected.

7. An apparatus for rendering 3-dimensional computer graphic images which include translucent and opaque objects, comprising:
    means for subdividing a scene to be rendered into a plurality of rectangular sub-regions;
    means for determining for each of the sub-regions a list of objects which may be visible in the images;
    means for determining for each pixel in each object in the list whether or not the object in the list may be visible at that pixel;
    a tag buffer for storing a data tag for the translucent or opaque object determined to be visible at the pixel; and means for passing the data tag from the tag buffer and object data for the object to a texturing and shading unit in response to a determination that the translucent or opaque object is overwriting a location in the tag buffer already occupied by another data tag.

8. The apparatus according to claim 7 further comprising:
means for clearing all the data tags for the pixel from all the tag buffers when an opaque surface is determined to be visible at the pixel; and
means for storing in one of the tag buffers a new data tag associated with the opaque surface.

9. The apparatus according to claim 7 further comprising means for initially sub-dividing a scene to be rendered into a plurality of rectangular sub-regions and subsequently operating on each of the sub-regions.

10. The apparatus according to claim 7 further comprising:
means for determining whether or not the object is a punch through object; and
means for performing a different process when the punch through object is detected.

11. The apparatus according to claim 7 further comprising:
means for determining whether or not the punch through object is opaque;
means for clearing all the data tags from all the tag buffers for the pixels intercepted by the punch through object if it is opaque; and
means for sending opaque punch through object data to the texture and shading unit (TSU).

12. The apparatus according to claim 7 further comprising:
means for determining whether or not the punch through object is translucent; and
means for passing all the data tags and the object data for the pixel to the texture and shading unit if a translucent punch through object is detected, including object data for the translucent punch through object.

\* \* \* \* \*